(12) United States Patent
Klett et al.

(10) Patent No.: US 6,430,935 B1
(45) Date of Patent: Aug. 13, 2002

(54) PERSONAL COOLING AIR FILTERING DEVICE

(75) Inventors: James Klett, Knoxville, TN (US); Bret Conway, Denver, NC (US)

(73) Assignee: UT-Battelle, LLC, Oak Ridge, TN (US)

(*) Notice: Subject to any disclaimer, the term of this patent is extended or adjusted under 35 U.S.C. 154(b) by 0 days.

(21) Appl. No.: 09/934,501

(22) Filed: Aug. 22, 2001

(51) Int. Cl.$^7$ ................................................ F25B 21/02
(52) U.S. Cl. ................................ 62/3.3; 62/3.7; 165/65
(58) Field of Search ........................... 62/3.2, 3.3, 3.61, 62/3.7; 165/80.3, 64, 65

(56) References Cited

U.S. PATENT DOCUMENTS

| | | | |
|---|---|---|---|
| 5,010,777 A | * 4/1991 | Yehl et al. | ................ 73/864.81 |
| 6,018,616 A | * 1/2000 | Schaper | ...................... 392/418 |
| 6,033,506 A | 3/2000 | Klett | |
| 6,037,032 A | 3/2000 | Klett et al. | |
| 6,130,411 A | * 10/2000 | Rockenfeller et al. | ...... 219/392 |
| 6,238,464 B1 | * 5/2001 | Dullien | ........................ 95/282 |

OTHER PUBLICATIONS

G.D. Mahan and L.M. Woods, "Multilayer Thermionic Refrigeration", *Physical Review* Letters, vol. 80, No. 18, pp. 4016–4019 (The American Physical Society 1998).

* cited by examiner

Primary Examiner—Denise L. Esquivel
Assistant Examiner—Melvin Jones
(74) Attorney, Agent, or Firm—Akerman, Senterfitt & Eidson, P.A.

(57) ABSTRACT

A temperature modification system for modifying the temperature of fluids includes at least one thermally conductive carbon foam element, the carbon foam element having at least one flow channel for the passage of fluids. At least one temperature modification device is provided, the temperature modification device thermally connected to the carbon foam element and adapted to modify the temperature of the carbon foam to modify the temperature of fluids flowing through the flow channels. Thermoelectric and/or thermoionic elements can preferably be used as the temperature modification device. A method for the reversible temperature modification of fluids includes the steps of providing a temperature modification system including at least one thermally conductive carbon foam element having flow channels and at least one temperature modification device, and flowing a fluid through the flow channels.

38 Claims, 4 Drawing Sheets

PERSONAL COOLING AIR FILTERING DEVICE

STATEMENT REGARDING FEDERALLY SPONSORED RESEARCH OR DEVELOPMENT

The United States Government has rights in this invention pursuant to Contract No. DE-AC05-00OR22725 between the United States Department of Energy and UT-Battelle, LLC.

CROSS-REFERENCE TO RELATED APPLICATIONS

Not Applicable.

FIELD OF THE INVENTION

The present invention relates to temperature modification systems, and more particularly to temperature modification systems which use carbon foam composite materials.

BACKGROUND OF THE INVENTION

Temperature modification systems proliferate today. Homes, offices, cars, trains, and aircraft, for example, all commonly use air conditioning and heating systems for the comfort of occupants.

Certain environments create challenging temperature modification goals for conventional temperature modification systems, such as restrictions on the size and weight of the temperature modification system. Such environments can also demand other modifications, such as a reduction in the level of harmful chemical pollutants and/or particulates. For example, in the automobile racing industry, and in particular NASCAR™, drivers are typically exposed for many hours to hot air having high concentrations of gasoline combustion by-products, including carbon monoxide. As a result, race car drivers frequently complain of fatigue, exhaustion, and dry mouth, symptoms of carbon monoxide (CO) poisoning and heat exhaustion.

A variety of devices have been conceived to provide cool filtered air to race car drivers. However, most are bulky and/or impractical. These devices are usually very simple in design, such as a bucket of ice water, ice, or even dry ice (solidified carbon dioxide), having a copper tube coiled through the bucket. Air is forced by a fan (typically at about 100 cfm) through the copper coil which results in cooling of the air. The cooled air is then filtered and provided to the helmet of the driver in an attempt to cool the driver's head.

Two problems plague this type of system. First, to supply a bucket of chilled material (e.g. ice) large enough to last the entire race (or even 1 hour) requires a large volume allocated for the cooling system. Second, supplying air to a driver's helmet in an attempt to cool the head is not an efficient method of cooling an individual since most of the cooled air does not enter the helmet. Poor efficiency results because the helmets are usually fit around a driver's head. Accordingly, there is generally only a small volume remaining in the helmet for the cooled air to circulate. Hence, the cooling efficiency for individuals using this type of system is generally very low.

Another type of cooling system uses a phase change material (other than ice) or chemical pack (a reaction which is endothermic provides the cooling) in place of the bucket of chilled material. However, this type of system suffers from the same limited cooled air circulation problem inherent when providing cool air to the helmet of an individual. Other attempts at providing personal cooling systems have targeted developing either complex cooling vests to be worn around the upper torso, or simple cooling vests with ice packs. These systems require the periodic changing of the chilled material or chemical pack. Accordingly, these designs are also generally impractical since they are usually worn under some sort of protective garment (e.g. under a fire suit by auto racers, by firefighters, under protective armor by police, SWAT, and military personnel). Difficulty or inability to change chilled material or chemical packs limits the time individuals can be exposed to harsh environments since changing out the chilled material or chemical packs under protecting garments is prohibitive in most environments (e.g. during a fire or on the 224th lap of a race).

Improved thermal materials have recently been discovered. For example, carbon foam is a material formed from carbon (graphite) fibers which possesses unique properties. Applicant and/or the assignee of the invention (or its predecessors in interest) have invented (or co-invented) processes for forming low density, high thermal conductivity carbon foam materials; e.g., U.S. Pat. No. 6,033,506 to Klett, U.S. Pat. No. 6,037,032 to Klett and Burchell; which are both incorporated herein by reference in their entirety. Through linkage of a plurality of graphitic elements within an appropriate matrix material, carbon foam structures described in the above patents have demonstrated thermal conductivities of approximately 187 W/m°K, while having densities of only approximately 0.55 g/cc. Thus, carbon foam elements can be produced which are more thermally conductive than aluminum, having approximately $\frac{1}{5}$ the weight of an aluminum element having the same volume.

SUMMARY

A temperature modification system for modifying the temperature of fluids includes at least one thermally conductive carbon foam element, the carbon foam element having at least one flow channel for the passage of fluids. The flow channel has an inlet and an outlet. At least one temperature modification device is provided, the temperature modification device thermally connected to the carbon foam element and adapted to modify the temperature of the carbon foam, which modifies the temperature of fluid passing through flow channels within the carbon foam.

The temperature modification device can be selected from devices having a first and second side and adapted for reversible operation between two states. A first state, the first side is heated while the second side is cooled. In a second state, the first side is cooled while the second side is heated. Thermoelectric and/or thermoionic elements can provide the above features. In a preferred embodiment of the invention, the temperature modification device can be interposed between two carbon foam elements.

The temperature modification system can include at least one fluid filter, the fluid filter disposed in series with the flow channels. The fluid filter is preferably disposed in direct fluid connection with the flow channel outlet if the outlet temperature is cooler than the inlet temperature. If the outlet temperature is warmer than the inlet temperature, the fluid filter is preferably disposed in direct fluid connection with the flow channel input. The system can also include at least one fluid conduit, such as a hose, for directing temperature modified fluids emitted from the outlet.

A mask can be provided for receiving fluids emitted from the hose, the mask adapted to provide fluids to an individual. In this embodiment, at least one fluid filter can be provided, the fluid filter disposed in series with the flow channel. Preferably, the fluid filter is an activated carbon filter. Preferably, the fluid filter is disposed in direct fluid connection with the flow channel outlet if the outlet temperature is cooler than the inlet temperature. If the outlet temperature is warmer than the inlet temperature, the fluid filter is preferably disposed in direct fluid connection with the flow channel input.

The system can include a control system. The control system can have a polarity switch adapted for switching the sides of the temperature modification device between heating and cooling modes when an appropriate temperature modification device is provided in the system (e.g. thermoelectric, thermoionic).

A method for the reversible temperature modification of fluids includes the steps of providing a temperature modification system including at least one thermally conductive carbon foam element, the carbon foam element having at least one flow channel, and at least one temperature modification device. The temperature modification device is thermally connected to the carbon foam element. A fluid is flowed through the flow channel. The temperature of the fluid emitted from an outlet of the system is modified relative to a temperature of the fluid received at an inlet of the system.

Preferably, the temperature modification device is adapted for switching between heating and cooling modes. Switching between heating and cooling modes can be provided by thermoionic and/or thermoelectric elements. The method can also include the step of filtering the fluid. The fluid filter is preferably disposed in direct fluid connection with the flow channel outlet if the outlet temperature is cooler than the inlet temperature. If the outlet temperature is warmer than the inlet temperature, the fluid filter is preferably disposed in direct fluid connection with the flow channel input.

In another embodiment of the invention, a temperature modification system having a temperature modification device with the ability to heat one side and cool its other side can include a switching manifold. The switching manifold has at least one flow diverting switch for selective transmission of fluids from at least two fluid flows received, a first fluid flow being a heated fluid emitted from an outlet channel which is heated by one of the sides of the temperature modification device, and a second fluid flow being a cooled fluid emitted from an outlet channel which is cooled by the other of the sides of the temperature modification device. The switch can be electronically actuated, preferably provided by a signal transmitted by a thermostat.

The method can also include the step of directing temperature modified fluids which are emitted from the outlet. Temperature modified fluids emitted from the outlet can be supplied to at least one individual. When the temperature modification device provided is adapted for switching between heating and cooling modes, the sides of the temperature modification device can be switched between heating and cooling.

An apparatus having a substantially enclosed volume and a temperature modification system for modifying the temperature of fluids contained within the volume includes at least thermally conductive carbon foam element. The carbon foam element has at least one flow channel for the passage of fluids, the flow channel having an inlet for receiving fluids and an outlet for the emission of fluids, the fluids being received from substantially within the volume. At least one temperature modification device is provided, the temperature modification device being thermally connected to the carbon foam element. The temperature of fluids emitted from the outlet is modified relative to a temperature of fluids received at the inlet.

The enclosed volume can be a vehicle. The vehicle can be a motor vehicle. The motor vehicle can include at least one gas filter, the gas filter disposed in series with the flow channel. The gas filter can be disposed in direct fluid connection with the outlet. The gas filter is preferably disposed in direct fluid connection with the flow channel outlet if the outlet temperature is cooler than the inlet temperature. If the outlet temperature is warmer than the inlet temperature, the gas filter is preferably disposed in direct fluid connection with the flow channel input. In this embodiment, at least one gas conduit such as a hose, can be provided for directing temperature modified fluids emitted from the outlet. A mask can receive gases emitted by the gas conduit. The mask can be adapted to provide temperature controlled and filtered air to at least one occupant of the motor vehicle. The gas filter can be an air filter, the air filter adapted to trap gases including CO.

BRIEF DESCRIPTION OF THE DRAWINGS

A fuller understanding of the present invention and the features and benefits thereof will be accomplished upon review of the following detailed description together with the accompanying drawings, in which.

DETAILED DESCRIPTION OF THE INVENTION

Carbon foam, also referred to as graphite foam, is a very unique material. The combination of high thermal conductivity, a high degree of open porosity and large exposed surface area per unit volume provided by the carbon foam allows for improved temperature modification devices. Improved temperature modification devices can include heat exchangers and/or heat sinks using carbon foam heat exchange devices, which transfer heat energy from one area to another, and heat sinks, which dissipate heat into the ambient (e.g. air). In some applications, temperature modification systems using carbon foam may even be portable, capable of being carried by an individual.

Carbon foam is machinable into a variety of shapes from carbon foam elements having standard shapes. Alternatively, carbon foam elements can be formed in molds having desired final shapes, avoiding the need to machine the carbon foam. Carbon foam elements can be formed in a variety of shapes known to improve heat transfer, such as a variety of cooling fin configurations commonly used in radiator designs to optimize heat transfer to a heat sink, such as the ambient.

As described in U.S. Pat. No. 6,033,056 to Klett, carbon foam may be formed from a pitch powder, pitch granules, or pitch pellets. The pitch can be placed in a mold, the mold having the desired final shape of the foam element to be formed. Pitch materials can be solvated if desired. A proper mold release agent or film can be applied to the sides of the mold to improve removal of the part. For example, boron nitride spray or a dry graphite lubricant may be used as a mold release agent.

The sample can then be placed in a volume evacuated to less than approximately 1 torr and then heated to a temperature of approximately 50 to 100° C. above the softening point of the pitch. At this point, the vacuum is released to a nitrogen blanket. A pressure of up to 1000 psi is then applied. The temperature of the system is then raised to 800° C., or a temperature sufficient to coke the pitch being from approximately 500° C. to 1000° C. This heating/pressurizing step is performed using a temperature ramp rate of generally no greater than approximately 5° C./min and preferably at about 2° C./min. The temperature is held at the high temperature setpoint (e.g. 800° C.) for at least 15 minutes to achieve an assured soak. The furnace power is then turned off and cooled to room temperature.

Preferably the foam is cooled at a rate of approximately 1.5° C./min with release of pressure at a rate of approximately 2 psi/min. During the cooling cycle, pressure is released gradually to atmospheric conditions. The foam can then be heat treated to approximately 1050° C. (carbonized) under a nitrogen blanket and then preferably heat treated in separate runs to 2500° C. and 2800° C. (graphitized) in an argon or other inert ambient.

The structure of carbon foam produced from the above technique can be analyzed and characterized using techniques such as photomicrography, scanning electron microscopy (SEM), X-ray analysis, and mercury porisimetry. Interference patterns under cross-polarized light can be used to demonstrate that the struts of the carbon foam formed are almost completely graphitic. That is, substantially all of the pitch is converted to graphite, the graphite being aligned along the axis of the struts. These struts are also similar in size and are interconnected throughout the foam. This indicates that the foam should have high stiffness and good strength. The foam structure is generally characterized as open cellular, meaning that the porosity is not closed. Porosity tests generally indicate the pore sizes to be in the range of approximately 50–300 microns. FIGS. 1–13B of the U.S. Pat. No. 6,033,506 to Klett provides additional details regarding the structure and composition of typical carbon foam produced.

In one embodiment of the invention, a temperature modification system for modifying the temperature of fluids includes at least one thermally conductive carbon foam element, the carbon foam element having at least one flow channel for the passage of fluids. Flow channels have inlets and an outlets for the passage of fluids, such as air. At least one temperature modification device is provided, the temperature modification device thermally connected to the carbon foam element and adapted to modify the temperature of the carbon foam, thus modify the temperature of fluids passing through the flow channels in the carbon foam.

Figure 1:
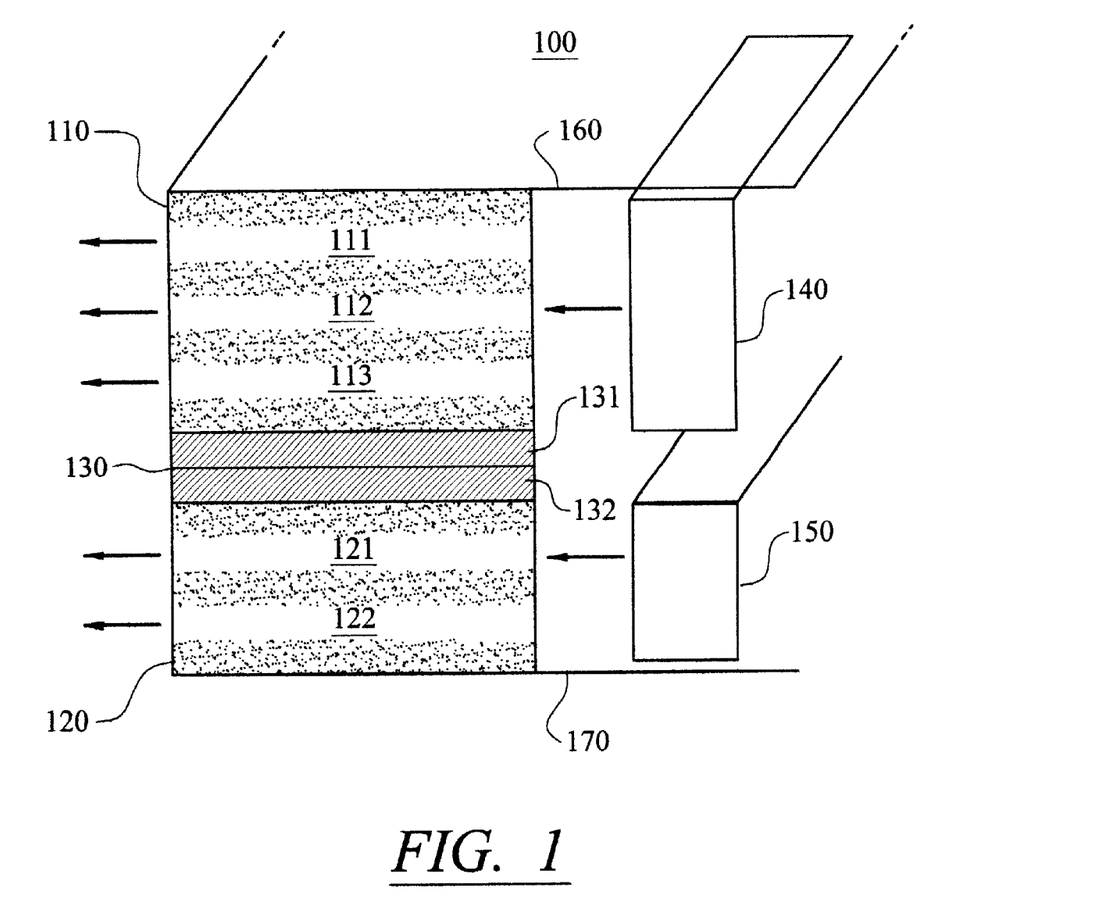
FIG. 1 illustrates a temperature modification system according to an embodiment of the invention.

Referring to FIG. 1, a temperature modification system 100 in accordance with an embodiment of the invention is shown. Carbon foam elements 110 and 120 can be machined or provided as two rectangular blocks 110 and 120. Vertical flow channels 111–113, 121 and 122 are shown which are limited in number only for simplicity. Flow channels 111–113, 121 and 122 are shown run through blocks 110 and 120, respectively, and are oriented parallel to the long face of system 100. In normal operation, block 110 is used as the hot side while block 120 is used as the cold side.

Block 110 is shown having approximately twice the volume of block 120, neglecting the channels cut therein. Allocation of more volume to the hot side compared to the cold side improves the efficiency of system 100. For example, the nominal hot side 110 can have a channel surface area of 533 square inches, while the cold side slot channel surface area can be 266 square inches. Mounting panels 160 and 170 are preferably included for structural support of system 100.

Between highly thermally conductive blocks 110 and 120, a temperature modification device 130 is interposed and in thermal contact with blocks 110 and 120. Temperature modification device 130 can be selected from substantially any device capable of performing heat exchange between blocks 110 and 120. Temperature modification device 130 is preferably interposed between blocks 110 and 120 and interfaced with the blocks 110 and 120 with mild, thermally conductive adhesives, such as those commonly used in the packaging of electronic devices.

In the preferred embodiment of system 100, temperature modification device 130 has a first side 131 and second side 132, and is adapted for reversible operation between two states. In a first state, the first side is heated while the second side is cooled, and a second state where the first side is cooled while the second side is heated.

The temperature modification device 130 is most preferably also capable alternating between heating and cooling. Heat exchange devices such as thermoionics and thermoelectrics are capable of heating one side while cooling the other side, and alternating between heating and cooling on each side.

A thermoelectric device uses the Peltier effect whereby heat is liberated or absorbed at a metallurgic junction when current passes from one metal (or semiconductor) to another. Upon a change in direction of the current, the effect is reversed. When power is supplied to the thermoelectric device, the Peltier effect causes one side of the device to cool and the other side to heat. As more heat is removed from the hot side, the cold side will become correspondingly colder.

The nominal hot side of the device in FIG. 1 is shown as block 110 and the cold side is shown as block 120. Upon a switch in the direction of current flow through the thermoelectric, block 110 will become the hot side while block 120 will become the cold side. The direction of current flow may be simply switched by reversing the polarity of the voltage applied (not shown) across the thermoelectric device.

A control system (not shown) can also be added to the system 100, preferably including a thermostat (not shown). In one embodiment, a control system can comprise a battery and a polarity switch (not shown). When the switch is in a first direction, air being filtered and supplied can be cooled. When the polarity of the temperature modification device 130 is switched, the filtered air emitted can then be heated. This is a very unique aspect of this invention as the system 100 can be used for modifying the temperature of both hot and cold environments. For example, when fighting fires in the winter in many locations, firefighters need cool air when in burning buildings and surrounded by heat, yet need warm air when he/she is outside the burning building and exposed to the winter like conditions.

Another preferred temperature modification device 130 capable of alternating between heating and cooling of a particular element is a thermoionic device. Thermionic refrigeration is described by G. D. Manhan and L. M. Woods, "Multilayer Thermionic Refrigeration," in *Physical*

Review Letters, Vol. 80, Number 18 4016–4019 (The American Physical Society 1998) and is incorporated by reference herein. Cooling is obtained in thermoionic emission after thermally excited electrons escape over a barrier, with the barrier typically being a semiconductor. Such a device has an expected efficiency somewhere between one and two, which is similar to Freon-based refrigeration as a heater/air conditioner for car, house, aircrafts.

A device for propelling fluids through channels 111–113, 121 and 122 can be used to improve efficiency of system 100 by forcing fluids through system 100. When air cooling is desired, for example, fans 140 and 150, such as squirrel cage fans, can be used to force air through flow channels 111–113, 121 and 122. In one embodiment, block 110 is heated while block 120 is cooled, while fan 140 and 150 forces air through flow channels 111–113, 121 and 122. For example, fan 140 can blow 25 cfm of air at a pressure drop of 0.5 inches water while fan 150 can blow 10 cfm of air at a pressure drop of 0.5 inches water.

When used to modify the temperature of gases such as air, the air can be 12 drawn into the channels 111–113, 121 and 122 and forced down the channels where heat transfer is effected. In many cooling applications, hot air is generally emitted to the ambient using a hose which directs emitted hot air to a specific location (e.g. out of a car).

On humid days which can commonly occur in certain climates, air cooled by system 100 may condense water vapor therein. However, system 100 can be configured in a vertically oriented design having a catch pan or drain to accommodate condensation formed. In this configuration, air can be driven up and out of system 100 by fans 140 and 150, while gravity can direct condensation downward out of the system 100. Additional auxiliary moisture removal apparatus can be added as required for a given application.

Fluid filters may be disposed in series with flow channels 111–113, 121 and 122. The fluid filter is preferably disposed in direct fluid connection with the flow channel outlets if the outlet temperature is cooler than the inlet temperature. If the outlet temperature is warmer than the inlet temperature, the fluid filter is preferably disposed in direct fluid connection with the flow channel inputs.

Alternatively, fluids can be filtered prior to cooling or after heating. However, it is more efficient to filter after cooling due to the thermodynamic effects of adsorption.

Figure 2:
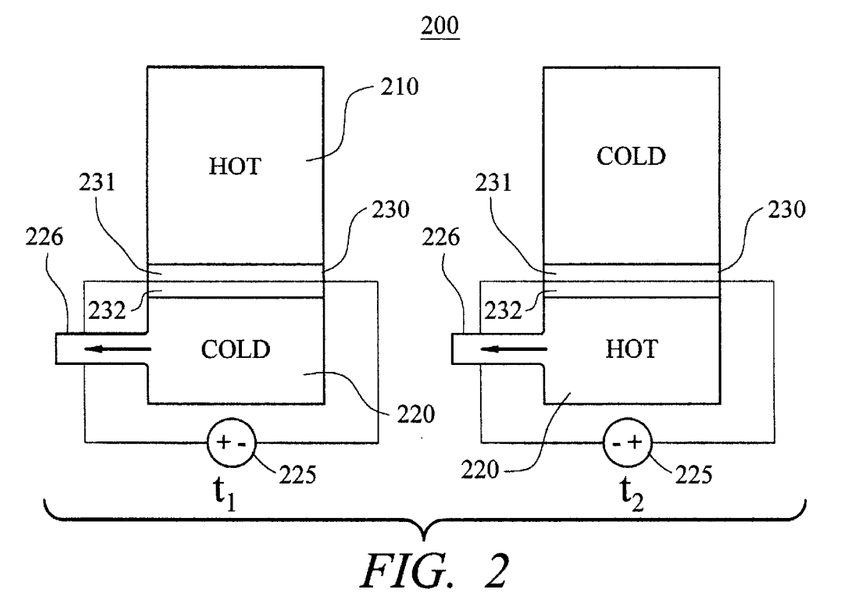
FIG. 2 illustrates a temperature modification system capable of switching an output between heating and cooling modes, according to yet other embodiments of the invention.

Now referring to FIG. 2, a temperature modification system 200 capable of switching between heating and cooling modes is shown. For simplicity, flow channels have been omitted. At a first time, labeled tl, DC power supply, such as voltage source 225 supplies high electrical potential to first side 231 of temperature modification device 230, while low potential is supplied to second side Ski 232 of temperature modification device 230 (e.g. thermoelectric). The DC power supply 225 can be selected from a variety of power sources such as batteries (e.g. 12V) and rectified AC power supplies appropriately voltage limited to avoid damage to temperature modification device 230. In the arrangement shown in FIG. 2, fluid emitted from block 220 into conduit 226 will be cooler than fluid input at the inlet of block 220.

By reversing the polarity of the applied voltage supplied by DC power supply 225 as shown at time $t_2$ in FIG. 2, fluid emitted from block 220 into conduit 226 will be warmer than fluid input at the inlet of block 220. Thus, system 200 is capable of switching between heating and cooling modes.

Figure 3:
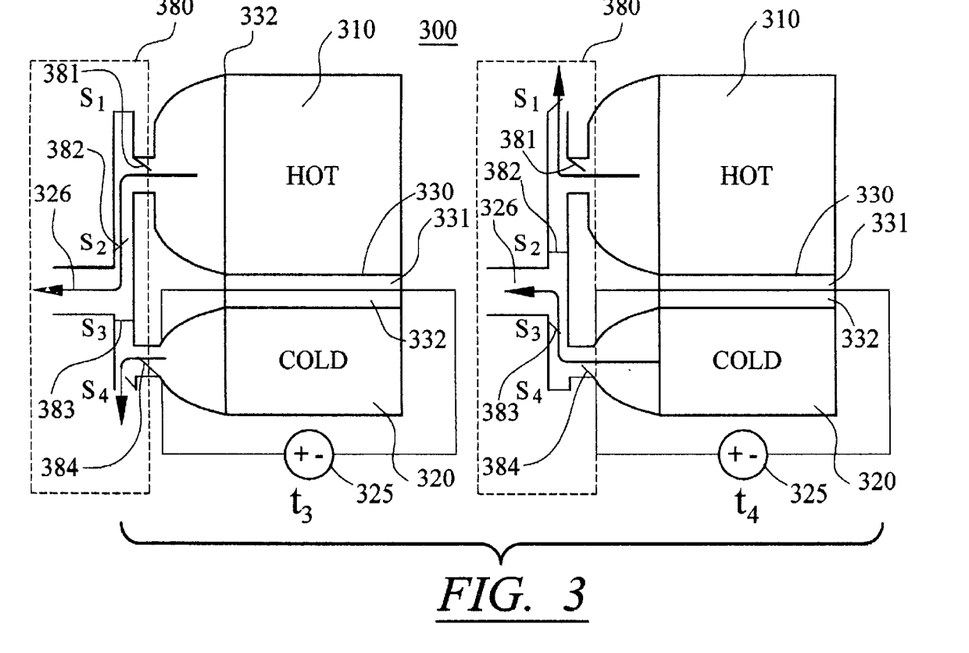
FIG. 3 illustrates a temperature modification system including a switching manifold capable of switching an output between heating and cooling modes, according to yet other embodiments of the invention.

An alternative embodiment of temperature modification system 300 capable of switching between heating and cooling modes is shown in FIG. 3. When two thermally conductive (e.g. carbon foam) blocks are used and sized differently, such as when a larger block is provided to the nominal hot side to provide higher system efficiency, a system 300 capable of switching between heating and cooling without losing significant efficiency can be implemented by adding an additional device which can deliver fluid output from either block 310 or 320 to a given conduit 326. For example, switching manifold 380 can be used to deliver fluid output from either block 310 or 320 to conduit 326. Switching manifold 380 shown includes switches 381–384 which are used to divert fluid flow. Switches 381–384 are preferably electrically actuated and responsive to thermostat signal.

For simplicity, flow channels have again been omitted in FIG. 3. At a first time, labeled $t_3$, DC power supply 325 supplies high electrical potential to first side 331 of temperature modification device 330 (e.g. thermoelectric), while low potential is supplied to second side 332 of temperature modification device 330. In this configuration, heated fluid is supplied to conduit 326 by opening switches 382 and 381 and closing switches 383. Switch 384 being open permits cooled fluid to be expelled (e.g. to the ambient). A suitable controller (not shown) preferably including a thermostat can be used to direct the switching of switches 381–384.

At the time denoted as $t_4$ in FIG. 3, it may be desired to provide cooled fluid to conduit 326. The configuration shown in FIG. 3 which includes switching manifold 380 permits the polarity of power supply 325 to remain unchanged when switching between heating and cooling modes. Instead of switching the polarity of power supply 325, switche 382 can be closed, while switches 384 and 384 can be opened. The configuration shown during time $t_4$ permits element 320 to supply cooled fluid to conduit 326, while switch 381 permits heated fluid to be expelled (e.g. to the ambient). Thus, during both heating ($t_3$) and cooling ($t_4$) modes, system 300 advantageously uses larger block 310 for heating while the smaller block 320 is used for cooling. Moreover, there is no need to switch the polarity of power supply 325.

An apparatus having a substantially enclosed volume and a temperature modification system for modifying the temperature of fluids contained within the volume can also be provided using the invention. Enclosed volumes can include structures such as buildings and vehicles, the structures normally having occupants within. The apparatus has at least one thermally conductive carbon foam element, the carbon foam element having at least one flow channel for the passage of fluids. The flow channel has an inlet for receiving fluids and an outlet for the emission of fluids, the fluids received from substantially within the volume. At least one temperature modification device is provided, the temperature modification device thermally connected to the carbon foam elements. The temperature of a fluid emitted from the outlet is modified relative to a temperature of fluid received at the inlet. In a typical application, the fluid may be air.

Figure 4:
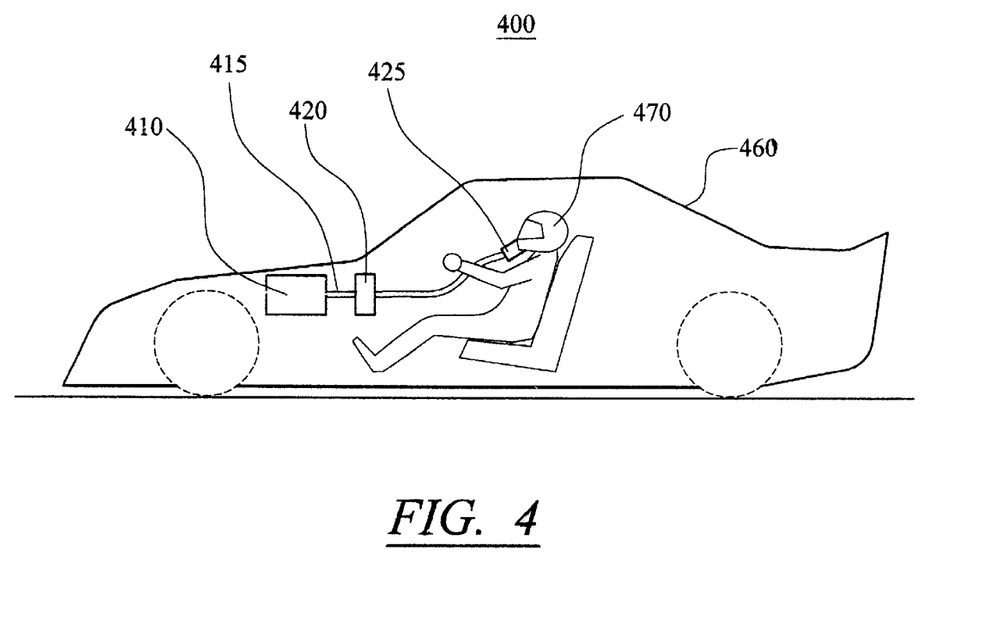
FIG. 4 illustrates a motor vehicle equipped with a temperature modification system, according to an embodiment of the invention.

Now referring to FIG. 4, an automobile, such as a racing car 460, is equipped with a temperature modification system 410 according to an embodiment of the invention. Racing cars can generate significant quantities of CO and heat, of which some portion reaches driver 470 if temperature modification system 410 and associated components are not supplied.

Temperature modification system 410 includes a fluid conduit, such as hose 415, and a fluid filter, such as air filter 420 to substantially remove CO and cool the air supplied to driver 470. The invention can be used to provide cool air to the lungs of individuals, such as driver 470, which can efficiently cool an individual by cooling the blood of the individual. Since blood circulates from the lungs to the extremities (and head), a body can be cooled quickly by cooling the blood because a human body uses approximately 6 cfm of air, even under heavy duress (e.g. sprinting, jogging, long workouts). Therefore by cooling an individual through supplying cool air to the lungs, the size of the cooling device required can be reduced.

Hose 415 can be fluidly connected to mask 425 to the supply cooled filtered air to driver 470. This arrangement and can be modified to fit the desired needs of the individual. The mask can be a respirator, but the most preferred embodiment is a small fitting respirator that fits only over the nose and mouth.

EXAMPLE

Figure 5:
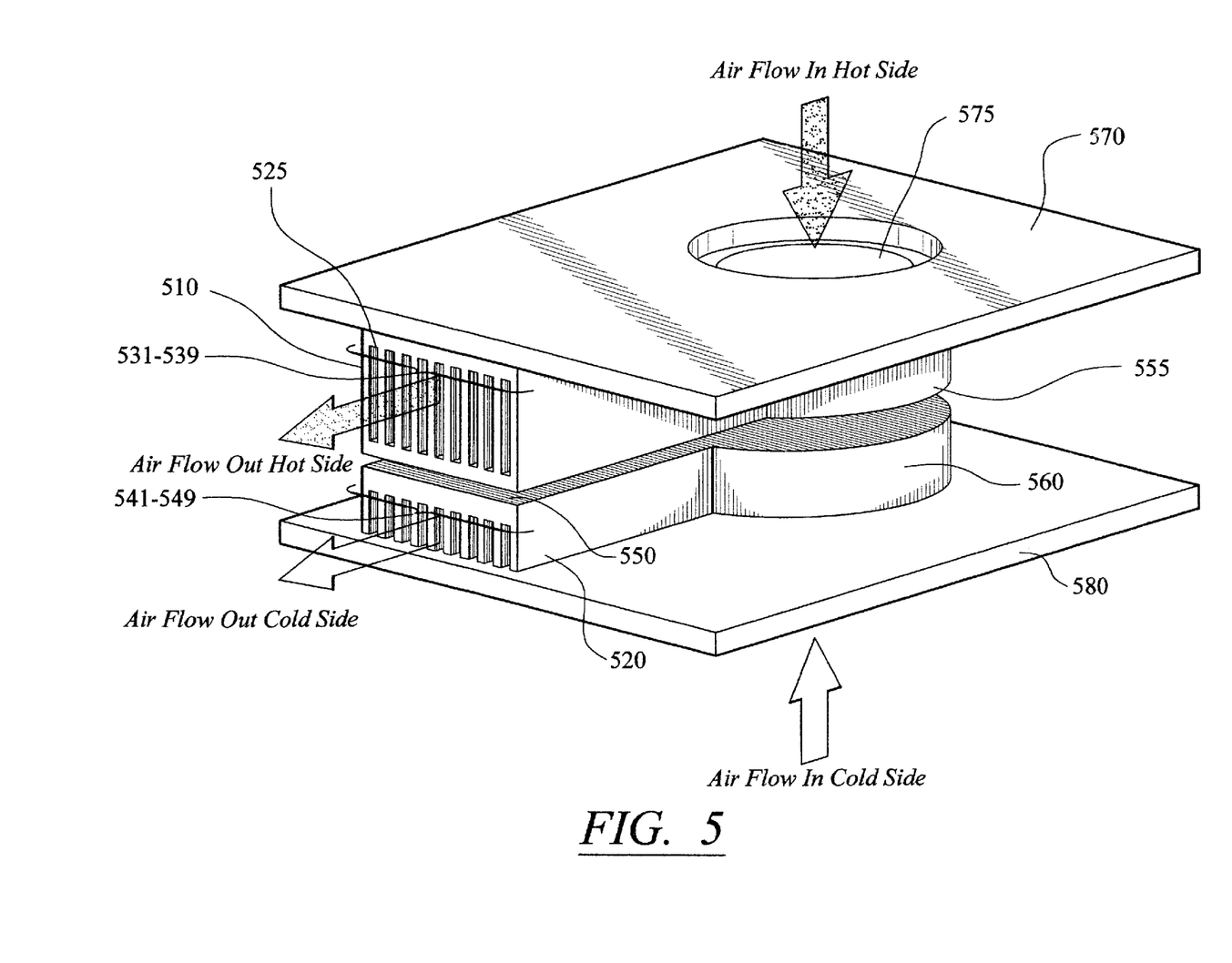
FIG. 5 illustrates a temperature modification device having a plurality of flow channels and thermoelectric devices, according to yet another embodiment of the invention.

A system, similar to system 100 shown in FIG. 1, but having eighteen (18) flow channels as shown in FIG. 5 was field tested. Nine (9) flow channels 531–539 were formed in carbon foam block 510, while nine flow channels 541–549 were also formed in carbon foam block 520. Each block had ten fins 525, the volume between fins forming channels 531–539 and 541–549. Block 510 had outer dimensions of 6.5×4.8×2.34 compared to block 520, which had outer dimensions of 6.5×4.8×1.17.

Including the area provided by the length of the fins oriented down the channels, the surface area provided by channels 531–539 is 533 square inches on the nominal hot side 510. The surface area similarly provided by channels 541–549 is 266 square inches on the nominal cool side 520. The fin width was the same as the channel width, so the cross-section for flow is roughly half that of the overall cross section of blocks 510 and 520.

Each carbon block 510 and 520 was equipped with squirrel cage fan 555 and 560 respectively, to draw hot air into channels 531–539 of block 510 through an opening 575 at the top of mounting panel 570. Similarly, fan 560 was used to draw cool air through an opening (not shown) in mounting panel 580 into channels 541–549.

Fan 555 provided 25 cfm of air at a pressure drop of 0.5 inches water while fan 560 provided 10 cfm of air at a pressure drop of 0.5 inches water. The system was equipped with two thermoelectric temperature modification devices 550 interposed between carbon foam blocks 510 and 520. Using a temperature modification device such as the thermoelectrics used, the degree of cooling can be controlled by controlling the amount of power which is supplied to the device. The thermoelectric devices each consumed 3.9 amps per chip at 12 volts during operation. A battery power supply used is not shown.

The system 100 weighed only approximately 1.2 pounds, making system 100 a highly portable system if desired. The system was operated in a cooling mode. Air emitted by block 520 was measured at 40 degrees ° F. from an ambient having a temperature of 77° F.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as described in the claims.

We claim:

1. A temperature modification system for modifying the temperature of fluids, comprising:

at least one thermally conductive carbon foam element, said carbon foam element having at least one flow channel for the passage of fluids, said flow channel having an inlet and an outlet, and, at least one temperature modification device, said temperature modification device thermally connected to said carbon foam element and adapted to modify the temperature of said carbon foam.

2. The temperature modification system of claim 1, wherein said temperature modification device has a first and second side and is adapted for reversible operation between two states, a first state where said first side is heated while said second side is cooled, and a second state where said first side is cooled while said second side is heated.

3. The temperature modification system of claim 2, wherein said temperature modification device includes at least one thermoionic element.

4. The temperature modification system of claim 2, wherein said temperature modification device includes at least one thermoelectric element.

5. The temperature modification system of claim 2, wherein said temperature modification device is interposed between two of said carbon foam elements.

6. The temperature modification system of claim 5, wherein said temperature modification device includes at least one thermoionic element.

7. The temperature modification system of claim 5, wherein said temperature modification device includes at least one thermoelectric element.

8. The temperature modification system of claim 1, further comprising at least one fluid filter, said fluid filter disposed in series with said flow channel.

9. The temperature modification system of claim 8, wherein said fluid filter is disposed in direct fluid connection with said outlet if said outlet temperature is cooler than said inlet, and said inlet if said outlet temperature is warmer than said inlet temperature.

10. The temperature modification system of claim 1, further comprising at least one fluid conduit for directing temperature modified fluids emitted from said outlet.

11. The temperature modification system of claim 10, wherein said fluid conduit is a hose, further comprising a mask for receiving fluids emitted from said hose, said mask adapted to provide fluids to an individual.

12. The temperature modification system of claim 11, further comprising at least one fluid filter, said fluid filter disposed in series with said flow channel.

13. The temperature modification system of claim 12, wherein said fluid filter is an activated carbon filter.

14. The temperature modification system of claim 12, wherein said fluid filter is disposed in direct fluid connection with said outlet if said outlet temperature is cooler than said inlet, and said inlet if said outlet temperature is warmer than said inlet temperature.

15. The temperature modification system of claim 1, further comprising a control system connected to said temperature modification system.

16. The temperature modification system of claim 2, further comprising a control system connected to said temperature modification system.

17. The temperature modification system of claim 16, wherein said control system includes a polarity switch adapted for switching said sides of said temperature modification device between heating and cooling modes.

18. The temperature modification system of claim 2, further comprising a switching manifold at least one flow diverting switch for selective transmission of fluids from at least two fluid flows received from said channel outlets, a first fluid flow being a heated fluid emitted from said outlet channel which is heated by one of said sides of said temperature modification device, and a second fluid flow being a cooled fluid emitted from said outlet channel which is cooled by the other of said sides of said temperature modification device.

19. The temperature modification system of claim 18, wherein said switch is electronically actuated.

20. The temperature modification system of claim 19, further comprising a thermostat, wherein said electronic actuation of said switch is provided by a signal transmitted by said thermostat.

21. A method for the reversible temperature modification of fluids, comprising the steps of:
   providing a temperature modification system including at least one thermally conductive carbon foam element, said carbon foam element having at least one flow channel, said flow channel having an inlet and an outlet for the passage of fluids, and at least one temperature modification device, said temperature modification device thermally connected to said carbon foam element, and
   flowing a fluid through said flow channel, wherein a temperature of said fluid emitted from said outlet is modified relative to a temperature of said fluid received at said inlet.

22. The method of claim 21, wherein said temperature modification device is adapted for switching between heating and cooling modes.

23. The method of claim 21, wherein said temperature modification device is at least one selected from the group consisting of thermoionic and thermoelectric elements.

24. The method of claim 21, further comprising the step of filtering said fluid.

25. The method of claim 24, wherein said filtering step is performed on fluids emitted from said outlet, if said outlet temperature is cooler than said inlet, and said inlet if said outlet temperature is warmer than said inlet temperature.

26. The method of claim 25, further comprising the step of directing temperature modified fluids emitted from said outlet.

27. The method of claim 24, further comprising the step of supplying said temperature modified fluid emitted from said outlet to at least one individual.

28. The method of claim 22, further comprising the step of switching said sides of said temperature modification device between heating and cooling modes.

29. An apparatus having a substantially enclosed volume and a temperature modification system for modifying the temperature of fluids contained within said volume, comprising:
   at least one thermally conductive carbon foam element, said carbon foam element having at least one flow channel for the passage of fluids, said flow channel having an inlet for receiving fluids and an outlet for the emission of fluids, said fluids received from substantially within said volume; and
   at least one temperature modification device, said temperature modification device thermally connected to said carbon foam element, wherein a temperature of a fluid emitted from said outlet is modified relative to a temperature of said fluid received at said inlet.

30. The apparatus of claim 29, wherein said enclosed volume is a vehicle.

31. The apparatus of claim 30, wherein said vehicle is a motor vehicle.

32. The apparatus of claim 31, further comprising at least one gas filter, said gas filter disposed in series with said flow channel.

33. The apparatus of claim 32, wherein said gas filter is disposed in direct fluid connection with said outlet, if said outlet temperature is cooler than said inlet, and said inlet if said outlet temperature is warmer than said inlet temperature.

34. The apparatus of claim 33, further comprising at least one gas conduit for directing temperature modified fluids emitted from said outlet.

35. The apparatus of claim 34, further comprising a mask for receiving gases emitted by said gas conduit.

36. The apparatus of claim 35, wherein said mask is adapted to provide temperature controlled and filtered air to at least one occupant of said motor vehicle.

37. The apparatus of claim 33, wherein said gas filter is an air filter, said air filter adapted to trap CO.

38. The apparatus of claim 36, wherein said gas filter is an air filter, said air filter adapted to trap CO.

* * * * *